United States Patent [19]
Desplats et al.

[11] 3,802,165
[45] Apr. 9, 1974

[54] APPARATUS FOR THE LIQUID PROTECTION OF GASEOUS EFFLUENTS

[75] Inventors: Rene Desplats, Montbonnot; Raymond Kuntz, La Tronche, both of France

[73] Assignee: Anvar Agence Nationale de Valorisation de La Recherche, Courbevoir, France

[22] Filed: Jan. 18, 1972

[21] Appl. No.: 218,797

[30] Foreign Application Priority Data
Jan. 19, 1971 France.............................. 71.02559
Jan. 4, 1972 France.............................. 7200133

[52] U.S. Cl.................................. 55/355, 137/254
[51] Int. Cl............................................ F16k 9/00
[58] Field of Search........................... 137/251–254; 55/355

[56] References Cited
UNITED STATES PATENTS
3,605,776  9/1971  Fullam.............................. 137/251
3,237,637  3/1966  Ainsworth.......................... 137/251
3,606,985  9/1971  Reed................................. 261/123
953,040  3/1910  Kruger.............................. 137/254
3,187,765  6/1965  Frank et al. ....................... 137/253
1,727,785  9/1929  Roth................................. 137/251
3,721,429  3/1973  Young et al. ...................... 55/355

*Primary Examiner*—Tim R. Miles
*Attorney, Agent, or Firm*—Young & Thompson

[57] ABSTRACT

An apparatus for the liquid protection of effluent gases comprises a vessel containing a liquid up to a predetermined level, a feed pipe for the effluent gases which ends below the liquid level within open-topped annular chambers so that increase in gas flow in the feed pipe depresses the liquid level and eventually permits upward escape of gases without passing through the liquid.

7 Claims, 3 Drawing Figures

APPARATUS FOR THE LIQUID PROTECTION OF GASEOUS EFFLUENTS

BACKGROUND OF THE INVENTION

1. Field of the Invention

This invention relates to apparatus for the liquid protection of effluent gases or vapours, for example gaseous effluents resulting from the treatment of hydrocarbons.

2. Description of the Prior Art

In known installations for the treatment of gaseous effluents devices for the liquid protection of the gases comprises a vessel containing a volume of liquid into which the end of the feed pipe for the gases is immersed, and through which the gas must pass before it is evacuated. The gas flow is usually irregular and gives rise to or maintains pulsations in the liquid corresponding to the escape of the gas.

An object of the present invention is to provide an apparatus for the liquid protection of gases in which the aforementioned disadvantages are minimised or eliminated.

SUMMARY

According to the invention an apparatus for the liquid protection of effluent gas comprises a vessel for containing liquid up to a predetermined level, a feed pipe for effluent gases having an end portion extending downwardly inside the vessel below the said liquid level, and a chamber surrounding the said end portion of the feed pipe, the chamber being open at the top and having a lower portion below the said liquid level so that as a gas flow from the feed pipe is increased the level of liquid in the feed pipe falls and the liquid overflows from the chamber, the gaseous effluent passing from the feed pipe into the chamber and escaping upwardly therefrom dispersing the liquid initially present in the chamber so that the gaseous effluent is discharged without passing through the liquid.

DESCRIPTION OF THE PREFERRED EMBODIMENTS

Figure 1:
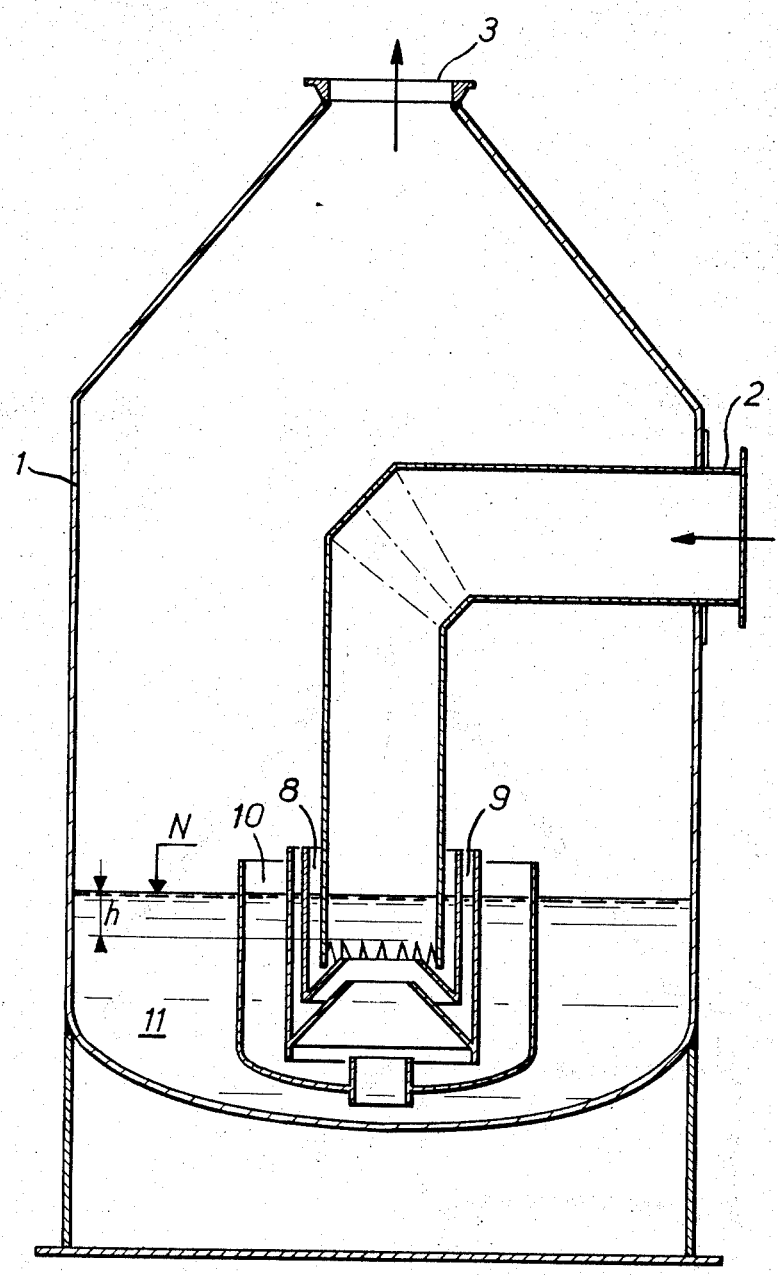
FIG. 1 is a vertical cross-section of one example of an apparatus according to the invention.
Figure 2:
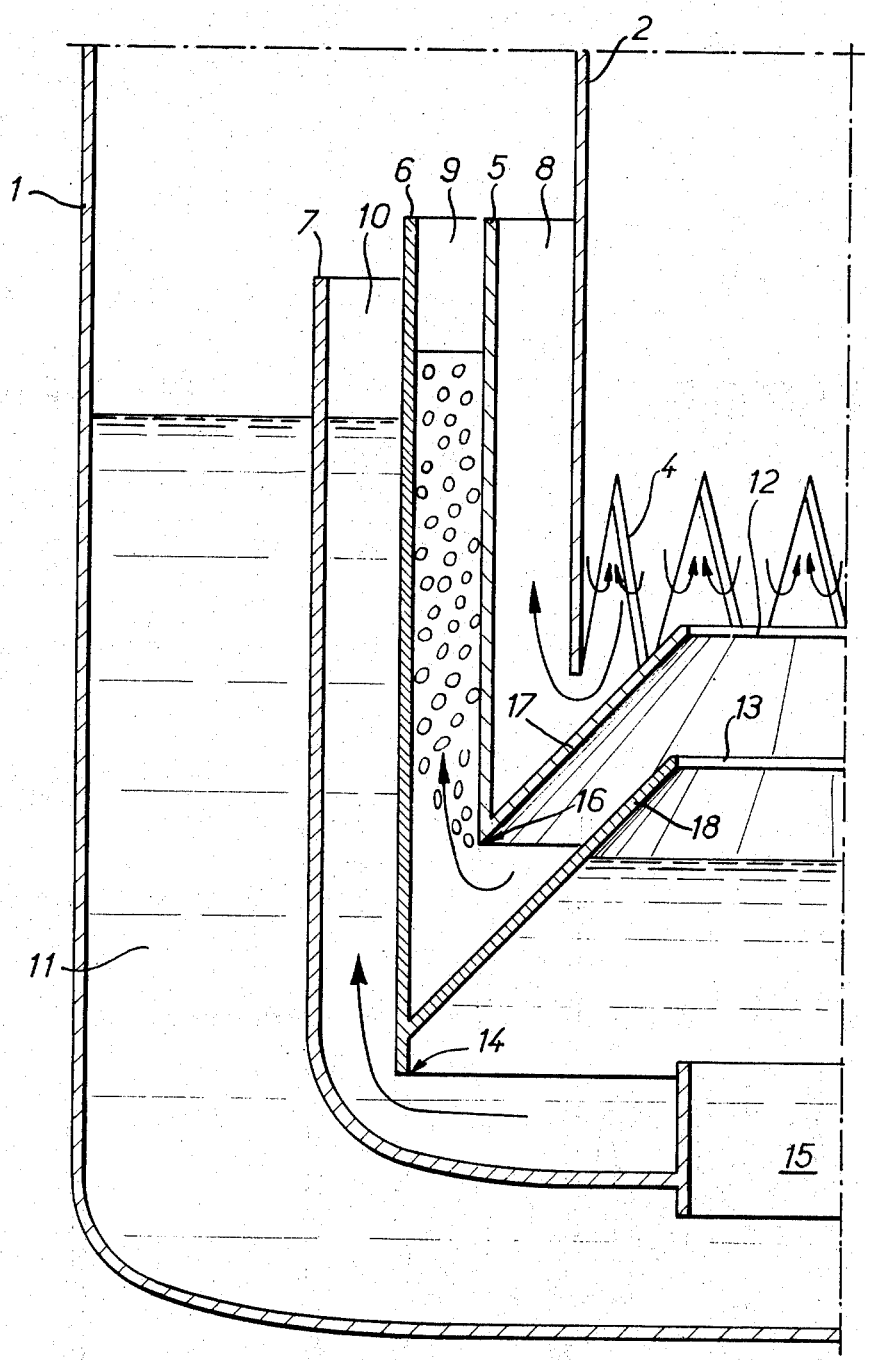
FIG. 2 is a detailed drawing of an enlarged scale of part of the apparatus shown in FIG. 1.

Referring to FIGS. 1 and 2, these Figures show vessel 1 containing of volume of liquid, e.g., water which, when at rest, reaches a level N which ensures a protective height h relative to the nearest opening of this level when at rest N. A feed pipe 2 is provided for bringing gas, for example the gaseous effluents arising out of hydrocarbon treatment installation and the discharge chimney 3 for the gas after it has passed through vessel 1.

Referring to FIG. 2 the feed pipe 2 has a serrated lower end 4. The lower end portion of the feed pipe is surrounded by annular walls 5, 6 and 7 forming respectively annular chambers 8, 9 and 10 which are open at both ends.

The water level when at rest is at N when the gas arrives through the feed pipe 2, and the level in the interior of the pipe 2 falls under the resulting pressure and first uncovers the tops of the serrated edge 4 flowing slowly, allowing the gas to escape through the first annular chamber 8, at first in the form of a gaseous emulsion, then totally dispersing the water originally in chamber 8, in proportion to the increase in flow of the gas.

As shown in FIG. 2 when the flow of gas increases some gas escapes simultaneously in the form of bubbles through the liquid in the second annular chamber 9 the entrance 16 to which is not yet completely emptied.

When this flow exceeds a certain rate, the level of water falls still further to uncover the entrance 16 of the second annular chamber 9 allowing a greater volume of gas to flow through this chamber in addition to the outflow which continues to escape through the first chamber 8.

The conical screens 17 and 18 have the effect of preventing water being entrained by the gas.

In the case of even higher rates of flow the level of the water will fall below the lower ridge 14 of the wall 6, allowing in addition outflow of gas through the chamber 10 which has a greater cross-sectional area than the preceding chambers 8 and 9.

In the event of it becoming imperative to evacuate very large quantities of gas, the liquid from vessel 1 could be drawn away with the gas. Means, not shown, may be provided in the enclosure 11 when filling the vessel which restores the level of the liquid at its original level when the apparatus is put into operation again. The water allowed into the enclosure 11 of the vessel will enter into the chambers through the opening 15.

Advantageously at least one of the chambers has a serrated edge at its base.

Figure 3:
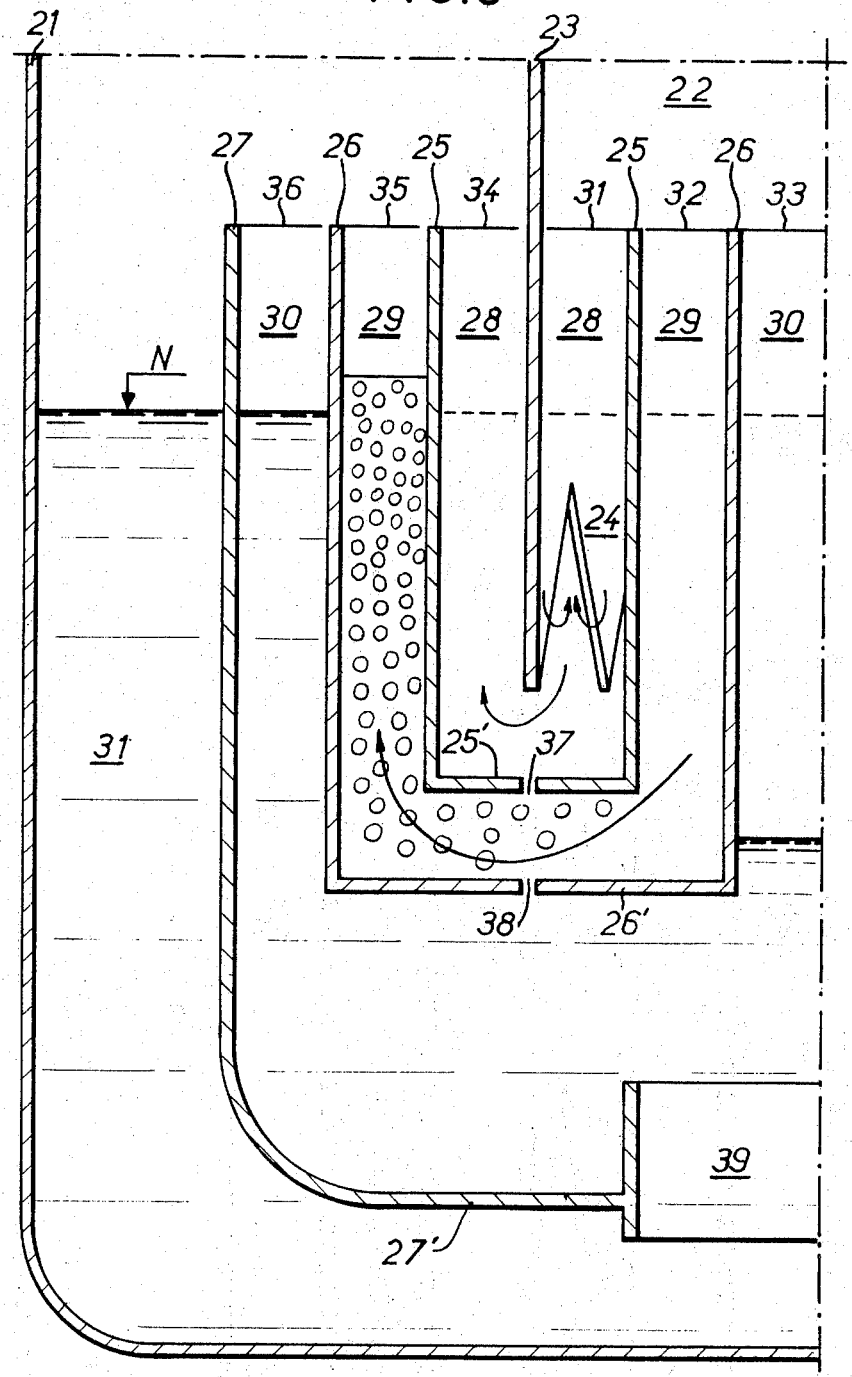
FIG. 3 is a vertical cross-section of another example of an apparatus according to the invention.

Referring to FIG. 3 this shows half a cross-section of a vessel 21 during operation, having a central feed pipe 22 for the gases which has a wall 23 with serrations 24 at its lower end. The pipe 22 is surrounded by annular walls 25, 26 and 27 connected in pairs by bases 25', 26' equipped with openings 37, 38 which respectively form annular chambers of generally U shaped configuration 28, 29 and 30 the ends of which are open, and the entrances 31, 32, 33 and outlet openings 34, 35 and 36 which are located above the level N of the water when there is no gas flow. In particular openings 31 and 32 are sufficiently above this position N to prevent them being affected by fluctuations in the said level in the interior of the pipe 22 during operation.

As the water level, when still, is at position N when the gas arrives through the conduit 22, the level in the interior of the conduit falls due to the pressure and uncovers the tops of the serrations 24, allowing the gas to escape through the first annular chamber 28 first in the form of a gaseous emulsion, then dispersing completely the water which was originally contained in the chamber 28, in proportion to the increase in the flow.

When the flow rate is increased a certain amount of gas escapes at the same time in the form of gaseous bubbles through the water from the second annular chambers 29 as the edge of wall 25 is uncovered. As the gas flow is increased, the level of water falls further at the base of the second annular chamber 29 thus enabling a greater flow of gas to escape through this chamber in addition to the flow which continues to escape through the first chamber 28.

In the event of a very considerable rate of gas flow, the water level falls below the edge of wall 26 allowing in addition a large flow of gas to be evacuated through the large dimensioned chamber 30.

In the course of operation the openings 37 and 38 at the base of each chamber 28 and 29 allow the chambers to be filled to their original level when the gaseous flow is reduced.

In the case of having to urgently evacuate very large volumes of gas the liquid from the vessel 21 could be entrained by the gas. Means (not shown) may therefore be provided in the enclosure 31 of vessel 21. These are for restoring the level of the water at its original level on the occasion of the resumption of normal operation of the apparatus. At that moment, water admitted into the enclosure 31 of the vessel penetrates the other chambers through the apertures 37, 38 and 39.

We claim:

1. Apparatus for the controlled venting of gaseous effluents, comprising a vessel for containing liquid up to a predetermined level, a feed pipe for gaseous effluents having an end portion dipping down into the vessel below said liquid level, means defining a series of chambers stacked inside one another surrounding said end portion of the feed pipe so that the innermost chamber is also the uppermost and the outermost chamber is also the lowermost, said means defining each chamber being open at its top above said liquid level and having an opening at its bottom, whereby increased flow of the gaseous effluents causes a drop of the liquid level in the feed pipe which expells the liquid in the innermost chamber and with further increased flow of the gaseous effluents expells the liquid in successive surrounding chambers enabling the escape of gas straight through the emptied chambers.

2. Apparatus according to claim 1, wherein the cross section for the flow of gaseous effluents through the chambers increases successively from the innermost chamber to the outermost chamber.

3. Apparatus according to claim 1, wherein a portion of the wall of at least some of the chambers extends upwardly inside the feed pipe, the rest of the wall of said chambers extending upwardly outside the feed pipe.

4. Apparatus according to claim 1, wherein the chambers are generally U-shaped in axial cross section and the opening in the bottom of the chamber is smaller than the cross section of the chamber.

5. Apparatus according to claim 1, wherein the feed pipe is of circular cross section and the surrounding chambers are annular.

6. Apparatus according to claim 5, further comprising a chamber surrounding the outermost chamber and having a bottom wall with an opening therein and an outer wall parallel to the feed pipe.

7. Apparatus according to claim 1, wherein the lower end of the feed pipe has a serrated edge.

* * * * *